H. O. REED.
Tables for Sawing-Machines.
No. 142,813.             Patented September 16, 1873.
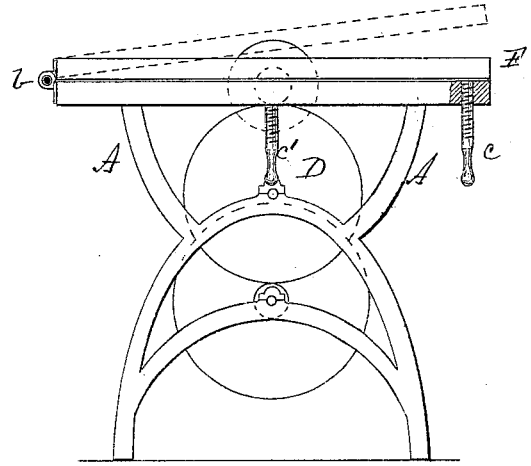
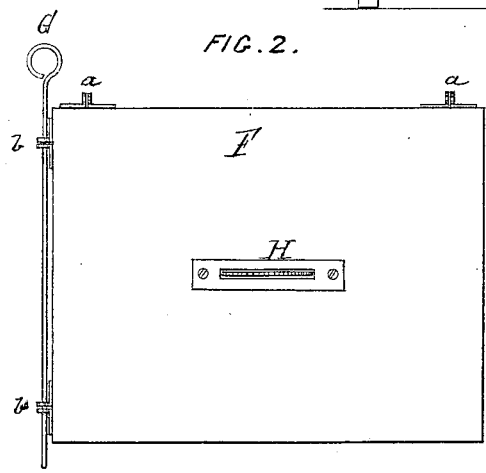
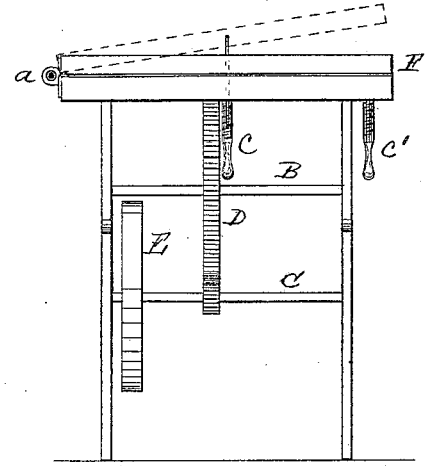

UNITED STATES PATENT OFFICE.

HENRY O. REED, OF BOSTON, MASSACHUSETTS.

IMPROVEMENT IN TABLES FOR SAWING-MACHINES.

Specification forming part of Letters Patent No. 142,813, dated September 16, 1873; application filed March 20, 1873.

*To all whom it may concern:*

Be it known that I, HENRY O. REED, of Boston, in the State of Massachusetts, have invented an Improved Table for Sawing-Machines, of which the following is a specification:

In the drawings, Figure 1 is a side view, Fig. 3 is an end view, and Fig. 2 a plan, showing my improved table applied to a frame, A, which supports the arbor for the saw, and also the shafts B and C, which carry the gear-wheel D, which meshes with the pinion on the saw-arbor, and also meshes with the pinion on the shaft C, which carries the fly-wheel E.

The table F is hinged to the frame A, as shown in Fig. 2, so that the pin G can be readily removed and inserted in the ears $a$ $a$, when it is desired to tilt the table in that direction—that is, so that the saw will not be at right angles to the table, as shown in Fig. 3. For this purpose a wide slot is made in the table, which is filled by the block H, when the table is hinged by the pin G in the ears $b$ $b$, in which case the saw is at right angles to the table, as shown in Fig. 1, and projects through the narrow slot in the block H.

With my improved table the stock can be cut at an obtuse angle, and angular grooves can be cut in it.

The set-screws $c$ $c'$ support the table at the required angle.

I do not claim hinging the saw-table so that it can be tilted on an axis parallel with the saw-arbor, as that is well known; but, so far as I know, no saw-table has ever been made which can be tilted in both directions, or on an axis at right angles to the saw-arbor, as well as on an axis parallel with it.

I do not claim to have invented adjustable saw-tables, as tables tilting in one direction are well known; and a table one part of which tilts in one direction and another part tilts in another direction is shown in the patent of Geiser, September 7, 1869, No. 94,592. My invention only extends to the special combination described, by which the same table may be tilted in either direction by means of the screws, ears, and pin described.

I claim as my invention—

The combination of the table F, having the wide slot at H, the two sets of ears $a$ $a$ and $b$ $b$, the pin G fitting each set of ears, and the two set-screws $c$ $c'$, with the frame A, the saw, and the mechanism for driving the saw, all substantially as described.

HENRY O. REED.

Witnesses:
J. E. KNOX,
GEO. H. McGREW.